(12) United States Patent
Molbech

(10) Patent No.: US 12,497,161 B2
(45) Date of Patent: Dec. 16, 2025

(54) AIRFOIL WITH AUGMENTED LIFT

(71) Applicant: AMONYX APS, Skjern (DK)

(72) Inventor: Allan Molbech, Skjern (DK)

(73) Assignee: AMONYX APS, Skjern (DK)

( * ) Notice: Subject to any disclaimer, the term of this patent is extended or adjusted under 35 U.S.C. 154(b) by 0 days.

(21) Appl. No.: 18/267,128

(22) PCT Filed: Dec. 15, 2021

(86) PCT No.: PCT/DK2021/050369
§ 371 (c)(1),
(2) Date: Jun. 14, 2023

(87) PCT Pub. No.: WO2022/128035
PCT Pub. Date: Jun. 23, 2022

(65) Prior Publication Data
US 2024/0116625 A1    Apr. 11, 2024

(30) Foreign Application Priority Data
Dec. 15, 2020   (DK) .......................... PA 2020 70836

(51) Int. Cl.
*B64C 21/02*    (2006.01)
*B64C 9/38*     (2006.01)
*B64C 21/04*    (2023.01)
*B64C 21/08*    (2023.01)

(52) U.S. Cl.
CPC .............. *B64C 21/025* (2013.01); *B64C 9/38* (2013.01); *B64C 21/04* (2013.01); *B64C 21/08* (2013.01)

(58) Field of Classification Search
CPC ......... B64C 9/38; B64C 21/025; B64C 21/04; B64C 21/08
See application file for complete search history.

(56) References Cited

U.S. PATENT DOCUMENTS

| | | | |
|---|---|---|---|
| 1,559,091 A | 10/1925 | Hall | |
| 2,628,793 A * | 2/1953 | Stalker | ...................... B64C 9/38 244/221 |
| 2,946,540 A | 7/1960 | Henri | |
| 3,093,349 A * | 6/1963 | Wagner | ................. B64C 21/025 244/212 |

(Continued)

FOREIGN PATENT DOCUMENTS

| | | |
|---|---|---|
| DE | 102007048942 A1 | 4/2009 |
| EP | 2955105 A1 | 12/2015 |

(Continued)

OTHER PUBLICATIONS

International Search Report for PCT/DK2021/050369 mailed Feb. 18, 2022.
Written Opinion for PCT/DK2021/050369 mailed Feb. 18, 2022.

*Primary Examiner* — William L Gmoser
(74) *Attorney, Agent, or Firm* — Schmeiser, Olsen & Watts, LLP

(57) ABSTRACT

An airfoil having a leading-edge and a trailing edge as well as a suction side and a pressure side is provided. The suction side including an injector slot towards the leading-edge. There may be at least one additional slot towards the trailing edge. The airfoil may be configured for an aircraft. A method of operating an aircraft using such airfoil is also provided.

10 Claims, 9 Drawing Sheets

(56) References Cited

U.S. PATENT DOCUMENTS

| | | | | |
|---|---|---|---|---|
| 3,142,457 A * | 7/1964 | Quenzler | ............... | B64C 21/06 |
| | | | | 244/211 |
| 3,604,661 A * | 9/1971 | Mayer, Jr. | ............... | B63B 1/38 |
| | | | | 114/67 R |
| 3,807,663 A * | 4/1974 | Bartoe, Jr. | ............... | B64C 3/14 |
| | | | | 244/207 |
| 3,920,203 A | 11/1975 | Moorehead | | |
| 3,974,987 A * | 8/1976 | Shorr | ............... | B64C 21/04 |
| | | | | 244/212 |
| 4,285,482 A | 8/1981 | Lewis | | |
| 4,848,701 A * | 7/1989 | Belloso | ............... | B64C 9/146 |
| | | | | 244/12.5 |
| 5,721,402 A * | 2/1998 | Parente | ............... | F02C 7/045 |
| | | | | 181/220 |
| 6,425,553 B1 * | 7/2002 | Smith | ............... | B64C 27/001 |
| | | | | 244/130 |
| 7,708,229 B1 | 5/2010 | Angle, II et al. | | |
| 7,823,826 B1 * | 11/2010 | Lewis | ............... | B64C 29/005 |
| | | | | 244/12.5 |
| 9,108,725 B1 | 8/2015 | Shmilovich et al. | | |
| 11,186,358 B2 * | 11/2021 | Hui | ............... | B64D 15/12 |
| 11,472,536 B1 * | 10/2022 | Alhussan | ............... | B64C 3/00 |
| 11,548,621 B1 * | 1/2023 | Robinson | ............... | B64C 21/08 |
| 2012/0068020 A1 * | 3/2012 | Milde, Jr. | ............... | B64C 23/02 |
| | | | | 244/207 |
| 2016/0068257 A1 * | 3/2016 | Sharma | ............... | B64C 21/08 |
| | | | | 244/99.8 |
| 2016/0375987 A1 * | 12/2016 | Shmilovich | ............... | B64C 9/16 |
| | | | | 244/207 |
| 2019/0009890 A1 | 1/2019 | Baker, Jr. | | |
| 2019/0078553 A1 | 3/2019 | Chen et al. | | |
| 2020/0115040 A1 | 4/2020 | Giannini | | |

FOREIGN PATENT DOCUMENTS

| | | |
|---|---|---|
| EP | 3251948 A1 | 12/2017 |
| ES | 1220721 U | 11/2018 |
| GB | 585865 A | 2/1947 |
| GB | 675 994 A | 7/1952 |
| GB | 2 088 521 A | 6/1982 |
| GB | 2390884 A | 1/2004 |
| WO | 2018158634 A1 | 9/2018 |

* cited by examiner

Fig. 8A
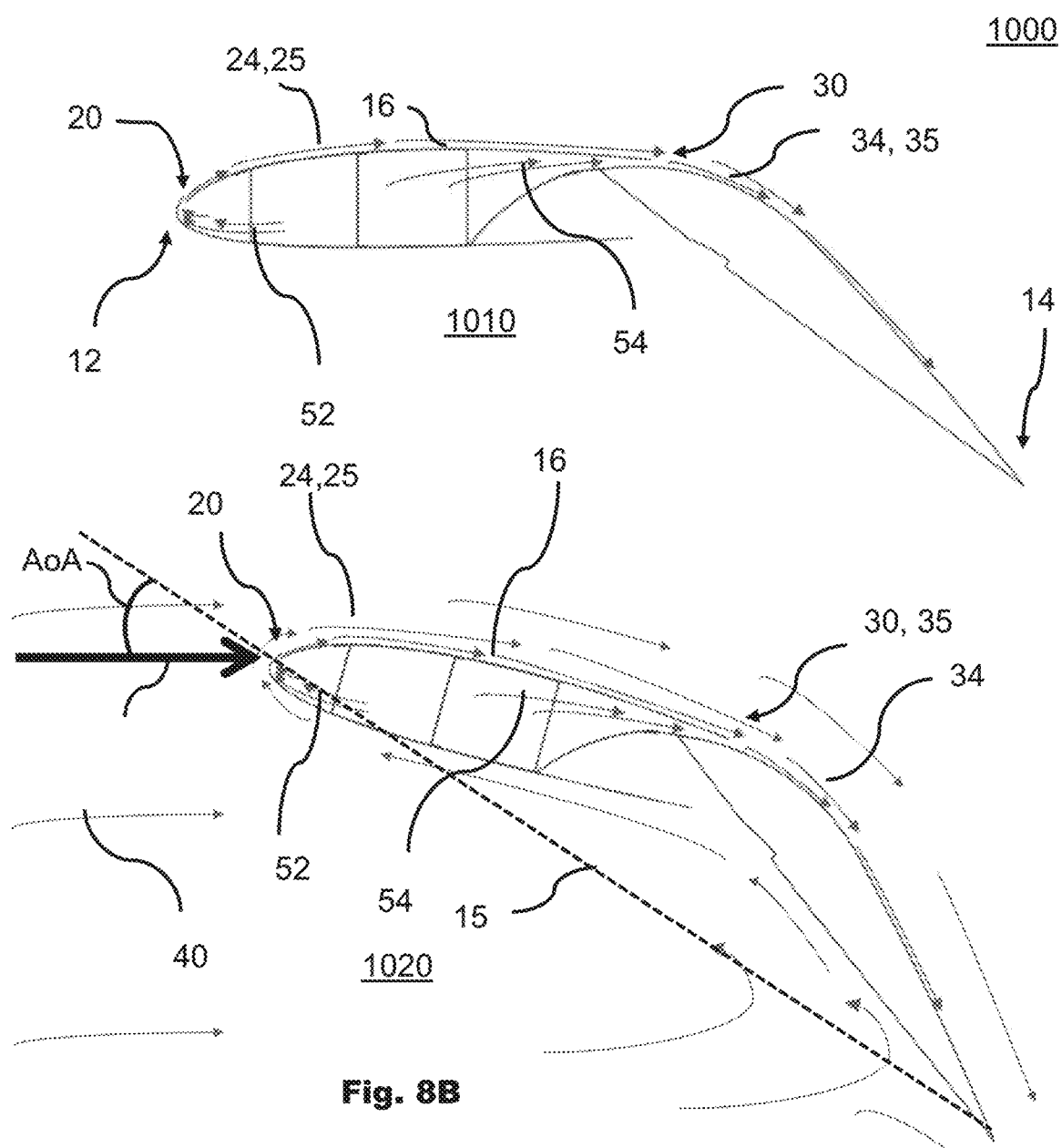
Fig. 8B
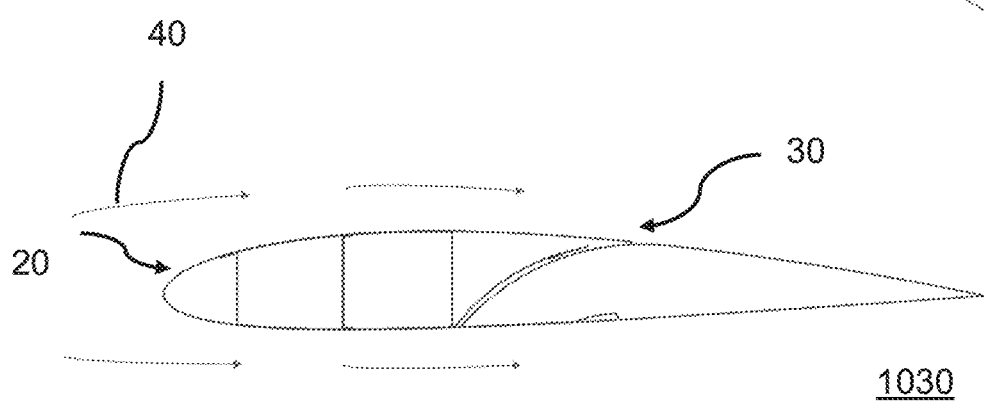
Fig. 8C

AIRFOIL WITH AUGMENTED LIFT

CROSS-REFERENCE TO RELATED APPLICATIONS

This application claims priority to PCT Application No. PCT/DK2021/050369, having a filing date of Dec. 15, 2021, which is based DK Application No. PA 2020 70836, having a filing date of Dec. 15, 2020, the entire contents both of which are hereby incorporated by reference.

FIELD OF TECHNOLOGY

The following relates to an airfoil having a leading-edge and a trailing edge as well as a suction side and a pressure side, the suction side comprising an injector slot towards the leading-edge.

There may be at least one additional slot towards the trailing edge. The airfoil may be configured for an aircraft. The following also relates to a method of operating an aircraft using such airfoil.

BACKGROUND

Starting and landing with aircrafts has, in essence, not changed since man took flight in the early 20th century. Thrust is provided by an engine and the aircraft is driven through the air. The wings generate lift which makes the aircraft airborne. Consequently, aircrafts require a straight, long and even runway to take-off and on which to land.

The phase of take-off and landing is an ongoing point of attention and re-visiting the fundamental aerodynamics concerning take-off and landing may be required. By closer examination of the elements of lift from an aerodynamic wing profile together with Bernoulli's principle, it is clear that the lift is a result of the pressure difference between the two sides of the airfoil.

The air pressure on each side of the airfoil is in direct link with the velocity of the air and the airfoil geometry. One side of the airfoil is geometrically shaped, so the flow of air is forced to accelerate (Bernoulli's principle/the law of conservation of energy) while the air passes the other side with little-to-no acceleration. Hereby, the air pressure on the "acceleration side" is reduced more significantly than on the other side, and a relative vacuum or suction is realized on the acceleration side. For this reason, the acceleration side is named "suction side (SS)" and the other side is named "pressure side (PS)".

Super short take-off and landing (Super-STOL) aircrafts generally have extremely complicated systems to provide lift while the aircraft is hovering, or whilst being in a vertical flight mode; and then to provide a combination of lift and thrust during a transition to forward flight, and then to provide thrust in a forward flight mode.

For example, the Lockheed Martin F-35 Lightning II "F-35B is an engineering marvel that uses a Rolls-Royce shaft-driven "LiftFan" propulsion system and an engine that can swivel 90 degrees when in short take-off/vertical landing mode. As the aircraft transition from vertical flight to forward flight, the nozzle pivots from a downward configuration to an aft configuration, thus redirecting thrust from the engine, to transition to forward flight, and vice-versa to transition from forward flight to vertical flight.

Another fascinating aircraft capable of both vertical and conventional forward flight is the Bell Boeing V-22 "Osprey" aircraft, commonly referred to as a "Tiltrotor" aircraft. It can takeoff both conventionally and vertically, hover, and land both conventionally and vertically. The V-22 has proprotors at its wingtips, which function as propellers and rotors. The proprotors, engines and gearboxes rotate from a forward flight position to the vertical hover/takeoff/land position. In a hover mode, the proprotors provide all lift and control with the required engine power being the highest when hovering. As the aircraft transitions to forward flight mode, the power and thrust of the engines are reduced since the wing generates more lift. Accomplishing both vertical and forward flight with this tiltrotor system can be considered a significant engineering accomplishment.

Yet another aircraft capable of Super-STOL is the Just Aircraft "SuperSTOL". This is an amateur-built experimental aircraft that can carry up to two people. The simple, yet efficient design is based on well-known aerodynamical principals comprising slats and wide flaps which are, to full benefit, also used by larger certified aircrafts. The benefits of these systems on a light aircraft like the "SuperSTOL" are the reason why this type of aircraft is recognized as STOL or Super-STOL capabilities.

Although these aircraft are incredibly versatile and impressive in their performance, they predominately include extremely complicated systems that are costly and maintenance intensive to support for both vertical and conventional flight profiles. The aviation industry is continually seeking ways to reduce complexity and cost while providing safety and reliability to STOL and Super-STOL aircrafts.

SUMMARY

An aspect relates to an airfoil having a leading-edge and a trailing edge as well as a suction side and a pressure side, the suction side comprising an injector slot towards the leading-edge. There may be at least one additional slot towards the trailing edge. The airfoil may be configured for an aircraft.

Thereby, a laminar airflow is induced and controlled exclusively on the suction side so that significant lift is generated, and super short take-off and landing (Super-STOL) is achieved.

The injector slot is configured to provide a fluid flow and to inject or introduce a flow substantially from the leading-edge and towards the trailing edge.

The injector slot may extend along substantially the whole span, only a part, or multiple parts of the airfoil.

The airfoil provides an aerodynamic lifting system for a Super-STOL aircraft comprising a lifting structure defining a leading-edge portion, a trailing edge portion, a suction side surface extending between the leading-edge portion and the trailing edge portion, and a pressure side surface extending between the leading-edge portion and the trailing edge portion.

The additional slot is configured to provide a fluid flow and to add or additionally introduce a flow towards the trailing edge, but from a location towards the trailing edge from the injector slot. That is the additional slot adds its own stream to flow from the injection slot.

The slots or opening may be configured to provide or feed a fluid flow, e.g., an air flow out through the slot or opening towards the suction side.

The slots may be along the airfoil or part of the airfoil. The injector slot and additional slot may each be a single slot or multiple individual slots along the span of the airfoil.

In an aspect there is an injector flap configured to operate on the suction side and to open, close, or regulate the opening of the injector slot.

Thereby, the flow provided to the suction side can be changed, controlled, or regulated.

In an aspect, there is at least one additional flap configured to operate to open, close, or regulate the opening of the least one additional slot.

Thereby, the flow provided to the suction side can be changed, controlled, or regulated.

The injector flap or leading-edge movable flap on the suction side may disposed along the leading-edge portion of the airfoil. This movable flap is hinged towards the lifting structure and-/or leading-edge portion to the airfoil. In its closed configuration, the movable flap is aligned with the aerodynamical profile of the wing. In its open configuration the movable flap is exposing an opening slot between the movable flap and the suction side. Inside the lifting structure at the leading-edge portion of the airfoil is a chamber that is disposed along the leading-edge portion of the lifting structure. The chamber is supplying the air for the air flow that is dispersing from the movable flap slot towards the trailing edge portion. During a Super-STOL stage, a velocity of air is dispersed from the injector flap or leading-edge movable flap slot towards the trailing edge portion.

The injector flap and thereby the injector slot may be controlled i.e., activated, opened, closed, regulated by an actuator arrangement which in some embodiments comprises a rotatable element with an actuator arm. The actuator arm may have a pin which slides in a slot and thereby presses/pulls the injector flap into a desired position when the rotatable element is activated and thereby rotated.

In an aspect, the injector slot is in communication with flow generating means feeding a flow to the injection slot. The communication may be considered an injector communication, channel, chamber, or flow path.

In an aspect, the additional slot is in communication with flow generating means feeding a flow to the additional slot.

The flow generating means may be a fan, a turbine, or a bleed air from an engine on the aircraft. The flow from a flow generating means may be conducted and arranged to feed a fluid flow, e.g., an air flow, to a desired slot. There may be individual flow generating means to respective slots and there may be multiple generating means feeding or supplying a flow to a single slot or multiple slots. Geometries may be varied to precisely or desirably achieve a flow velocity (direction and/or speed) as intended.

In an aspect, the injector slot and at least one additional slot is in communication with flow generating means feeding a flow to the respective injection slot and at least one additional slot.

In an aspect, the injector slot is configured with injector slot flow generating means feeding an injector flow at an injector flow speed, and wherein the at least one additional slot is configured with additional slot flow generating means feeding an additional flow at an additional flow speed independent of the injector flow speed.

Thereby achieving to boost or reduce the flow speed from the location of the additional slot and towards the trailing edge.

In an aspect, the injector flap is hinged by a flap hinge arrangement towards the trailing edge of the injector flap.

The flap hinge arrangement may be an uninterrupted sheet hinge arranged on the inside of the airfoil. A sheet hinge may provide an air tight flap hinge arrangement which may be advantageous by preventing airflow leakage at an undesirable point.

Thereby allowing the injector slot or opening to be located or arranged as close to the leading-edge as possible.

In an aspect, at least one additional slot is formed between a leading-edge part and a trailing edge part. That is the airfoil comprises a leading-edge airfoil part that and a trailing edge part, which parts together to form an airfoil depending on their relative position. The leading-edge part and the trailing edge part may be configured and arranged relative to each other so as to form an additional slot. Furthermore, the parts may be configured so as to operate to open, close, or regulate the opening of the at least one additional slot. Such change may be by changing the chord line of the trailing edge part relative to the chord line of the leading-edge part.

Thereby an additional slot or opening can easily be operated or adapted, whilst the aerodynamic properties of the airfoil is operated or adapted at the same time.

Thus, in embodiments, the additional slot or intermediate slot may be disposed along the suction side of the lifting structure between the leading-edge portion and the trailing edge portion. The additional slot or intermediate slot is opened and closed by dividing the airfoil at the intended slot position and hinging the trailing edge section towards the lifting structure and-/or the lifting structure on the pressure side, where the slot on the suction side is exposed when the trailing edge section is moved downwards towards the pressure side.

Alternatively, a movable flap may be hinged at the flap leading-edge towards the airfoil and-/or the lifting structure on the suction side, where in its closed configuration the movable flap is aligned with the aerodynamical profile of the wing.

A person skilled in the conventional art will appreciate combinations. Thus, the additional slot or the intermediate slot define an opening configured for dispersing a flow of air towards the trailing edge portion.

Inside the lifting structure at the intermediate slot portion of the airfoil is a chamber that is disposed along the intermediate slot portion of the lifting structure. The chamber is supplying the air for the air flow that is dispersing from the intermediate slot towards the trailing edge portion. During a Super-STOL stage, a velocity of air is dispersed from the intermediate slot towards the trailing edge portion.

Further, additional slots can also be employed along the suction side between the leading-edge portion and the trailing edge portion in order to assist with directing the flow of air as flight/lifting conditions may dictate.

Further, another movable flap, a trailing edge movable flap can also be employed at the trailing edge portion in order to assist with directing the flow of air as flight/lifting conditions may dictate.

A person skilled in the conventional art will appreciate the disclosed principles that can readily be implemented individually or applied with some experimentation. Likewise, the person skilled in the conventional art will appreciate combinations and adaptation to specific applications.

Thus, modification and adaption may be required to provide the flow of air via air ducts integrated into the wing design. In one embodiment electric fans are configured to provide the flow of air. In one embodiment, the flow of air is provided by bleed air from an engine on the aircraft.

The slot at the leading-edge, i.e., the injector slot, may be a continuous opening extending along a span of the lifting structure. The intermediate slot may be a continuous opening extending along a span of the lifting structure.

The leading-edge slot or injector slot may be configured with a plurality of openings extending along a span of the lifting structure. The intermediate slot or additional slot may be configured with a plurality of openings extending along a span of the lifting structure.

There may be one or more heaters disposed in the air flow line for de-icing.

The aircraft having the aerodynamic lifting system disclosed may be configured to be manned or unmanned.

The flaps, settings, flows may be controlled manually, semi-automatically or automatically by a flight computer.

A leading-edge movable flap on the suction side is disposed along the leading-edge portion of the airfoil. This movable flap is hinged towards the leading-edge portion to the airfoil and-/or the lifting structure. In its closed configuration the movable flap is aligned with the aerodynamical profile of the wing. In its open configuration the movable flap is exposing an opening slot between the movable flap and the suction side. Inside the lifting structure at the leading-edge portion of the airfoil is a chamber that is disposed along the leading-edge portion of the lifting structure. The chamber is supplying a flow of fluid that is dispersing from the movable flap slot towards the trailing edge portion. During a Super-STOL stage, the flow of fluid is dispersed from the leading-edge movable flap slot towards the trailing edge portion.

An intermediate slot is disposed along the suction side of the lifting structure between the leading-edge portion and the trailing edge portion. The intermediate slot is opened and closed by 1) dividing the airfoil at the slot position and hinging the trailing edge section towards the lifting structure and-/or the lifting structure on the pressure side, where the slot on the suction side is exposed when the trailing edge section is moved downwards towards the pressure side, or 2) a movable flap hinged at the flap leading-edge towards the airfoil and-/or the lifting structure on the suction side, where in its closed configuration the movable flap is aligned with the aerodynamical profile of the wing, or 3) a combination of "1" and "2". The intermediate slot is defining an opening slot configured for dispersing a flow of fluid towards the trailing edge portion. Inside the lifting structure at the intermediate slot portion of the airfoil is a chamber that is disposed along the intermediate slot portion of the lifting structure. The chamber is supplying the flow of fluid that is dispersing from the intermediate slot towards the trailing edge portion. During a Super-STOL stage, a flow of fluid is dispersed from the intermediate slot towards the trailing edge portion.

Further, another movable flap, a trailing edge movable flap can also be employed at the trailing edge portion in order to assist with directing the flow of air as flight/lifting conditions may dictate as set forth in greater detail below.

An aspect is achieved by a method of operating a device, e.g., an aircraft comprising an airfoil as disclosed.

There are acts or optimal steps that may be performed to operate e.g., the aircraft in aspect of preparing the airfoil for e.g., take-off or landing, in aspects of take-off or landing, and/or in aspects of cruising or during normal flight.

Acts relating to preparing the airfoil may comprise the following:

There is an act of providing an open injector slot. There is an act of providing at least one open additional slot.

There is an act of setting a chord line angle between the chord line of the trailing edge part and the chord line of the leading-edge part.

The chord line angle may be off-alignment, i.e., non-parallel (e.g., acute). A person skilled in the conventional art will appreciate using an angle according to the profile of the used airfoil. For example, a starting point of the angle may be about 20-60 degrees, e.g., 40 degrees. As such, the chord line of a leading-edge part and the chord line of a trailing edge part of the airfoil may form an angle above e.g., 20 degrees and about 40 degrees. Experimentation may provide a suitable range or preferable range.

There is an act of generating a flow to respective injector slot and at least one additional slot.

There is an act of or of conducting a suction side flow from the injector slot and towards the trailing edge. Such act may be the result of outlined aspects.

Acts relating to take-off or landing may comprise the following:

There is an act of generating a free air flow around the airfoil. Such act may be performed by moving forward the aircraft.

There is an act of adjusting the angle of attack (AoA) of the airfoil with respect to the free air flow.

Such acts are performed whilst a suction side flow from the injector slot and towards the trailing edge is maintained. The suction side flow may be maintained substantially laminar. As such, there is an act of maintaining a substantially laminar flow.

A person skilled in the conventional art will appreciate that the flow characteristics, including flow direction and/or speed, will have to be generated according to specific circumstances and that operational ranges will work and that optimal settings may be found. Experimentation and exploration are thus required.

For an airfoil such as the NACA 2412 modified or provided with an injector slot arranged towards the leading-edge may require a flow feed of about 95-125 m/s to provide desired aerodynamic properties, e.g., lift. A flow speed proved at an additional slot (booster slot) may be about 55-75 m/s. The adjusting of the angle of attack is higher otherwise designed for and all things equal. The ranges may serve as a starting point for experimentation and optimal combinations can be found through such experimentation.

Acts relating to cruising or flying the aircraft may comprise the following:

There is an act of closing the injector slot and closing the at least one additional slot. The closing may be performed independently for the two or more slots and the closing may be complete or in part.

There is an act of operating or flying the aircraft in flight by aligning the chord line of the trailing edge part and the chord line of the leading-edge part. That is to operate the airfoil as originally intended or designed.

An aspect is achieved by a flight computer configured to perform the acts as outlined.

An aspect is achieved by an aircraft configured with at least one airfoil as outlined and a flight computer as outlined.

EXAMPLES

For example, there may be an aerodynamic lifting system for a Super-STOL aircraft comprising a lifting structure defining a leading-edge portion and a trailing edge portion, an upper surface extending between the leading-edge portion and the trailing edge portion, and a lower surface extending between the leading-edge portion and the trailing edge portion. There may be a leading-edge movable flap disposed along the leading-edge portion of the suction side of the lifting structure, the movable flap is connected towards the leading-edge portion to the airfoil and-/or the lifting structure. In a fully closed configuration, the movable flap geometry is aligned with the original aerodynamical profile of the wing. In an open configuration, the movable flap is exposing an opening slot between the movable flap and the suction side, the slot defining an opening configured for dispersing a flow of air towards the trailing edge portion, the movable flap connected to the airfoil and-/or the lifting structure at the flap leading-edge or trailing edge.

There may be an intermediate slot disposed along the suction side of the lifting structure between the leading-edge portion and the trailing edge portion, the slot opening and closing is done by dividing the airfoil at the slot position and hinging the trailing edge section towards the lifting structure and-/or the lifting structure on the pressure side, where the slot on the suction side is exposed when the trailing edge section is moved downwards towards the pressure side, the slot defining an opening configured for dispersing a flow of air towards the trailing edge portion.

There may be an intermediate slot disposed along the suction side of the lifting structure between the leading-edge portion and the trailing edge portion. The slot opening and closing is done by a movable flap hinged at the flap leading or trailing edge towards the airfoil and-/or the lifting structure on the suction side, where, in its closed configuration, the movable flap is aligned with the aerodynamical profile of the wing, the slot defining an opening configured for dispersing a flow of fluid towards the trailing edge portion.

There may be a trailing edge flap that may be orientated at an angle relative to the upper surface of the lifting structure to direct the flow of air from the intermediate slot in a downwards direction and thereby provide additional lift to the lifting structure, and the flap angle may be dynamically varied to compensate for atmospheric conditions, and-/or to control the resulting lift vector.

Inside the aerodynamic lifting system as exemplified, at the leading-edge movable flap portion of the airfoil there is a chamber that is disposed along the leading-edge movable flap portion of the lifting structure, the chamber conveying the air for the air flow that is dispersing from the leading-edge movable flap slot towards the trailing edge portion.

Inside the aerodynamic lifting system, at the intermediate slot portion of the airfoil further is a chamber that is disposed along the intermediate slot portion of the lifting structure, the chamber conveying the air for the air flow that is dispersing from the intermediate slot towards the trailing edge portion.

The aerodynamic lifting system may further comprise electric fans configured to provide the flow of air, or the flow of air is provided by bleed air from an engine of the aircraft.

The aerodynamic lifting system may comprise a lifting structure that is selected from the group consisting of a wing, an elevator, an elevon, a stabilator, a canard, and a fuselage.

The leading-edge movable flap slot may comprise a plurality of openings extending along a span of the lifting structure.

The intermediate slot may comprise a plurality of openings extending along a span of the lifting structure.

The aerodynamic lifting system may further comprise at least one heater disposed in the air flow lines and chambers.

The aircraft may be a Super-STOL aircraft having the aerodynamic lifting system as disclosed. The aircraft may be unmanned or manned.

The aerodynamic lifting system may comprise the movable flaps and sections that are controlled by a flight computer. The computer may control one or more flaps and may control at least one of a rate of flow of air through the slot and a size of the slot is controlled to adjust a magnitude of the lift and lift vector.

For instance, there may be an aerodynamic lifting system comprising a lifting structure defining a leading-edge portion, a trailing edge portion, an upper surface extending between the leading-edge portion and the trailing edge portion, and a lower surface extending between the leading-edge portion and the trailing edge portion.

There may be a leading-edge movable flap disposed along the leading-edge portion of the suction side of the lifting structure, the movable flap is connected towards the leading-edge portion to the airfoil and-/or the lifting structure, in its fully closed configuration the movable flap geometry is aligned with the original aerodynamical profile of the wing, in its open configuration the movable flap is exposing an opening slot between the movable flap and the suction side, the slot defining an opening configured for dispersing a flow of fluid towards the trailing edge portion, the movable flap connected to the airfoil and-/or the lifting structure at the flap leading-edge or trailing edge.

There may be an intermediate slot that is disposed along the suction side of the lifting structure between the leading-edge portion and the trailing edge portion, the slot opening and closing is done by dividing the airfoil at the slot position and hinging the trailing edge section towards the airfoil and-/or the lifting structure on the pressure side, where the slot on the suction side is exposed when the trailing edge section is moved downwards towards the pressure side, the slot defining an opening configured for dispersing a flow of fluid towards the trailing edge portion.

There may be an intermediate slot that is disposed along the suction side of the lifting structure between the leading-edge portion and the trailing edge portion, the slot opening and closing is done by a movable flap hinged at the flap leading or trailing edge towards the airfoil and-/or the lifting structure on the suction side, where in its closed configuration, the movable flap is aligned with the aerodynamical profile of the wing, the slot defining an opening configured for dispersing a flow of fluid towards the trailing edge portion.

There may be a trailing edge flap that may be orientated at an angle relative to the upper surface of the lifting structure to direct the flow of fluid from the intermediate slot in a downwards direction and thereby provide additional lift to the lifting structure, and the flap angle may be dynamically varied to control the resulting lift vector.

The exemplified aerodynamic lifting system may be configured to operate in a fluid, where the fluid is a flow/liquid, gas, plasma, among others, and the lifting structure is selected from the group consisting of a wing, an elevator, an elevon, a stabilator, a canard, and a fuselage.

The leading-edge movable flap portion of the airfoil further is a chamber that is disposed along the leading-edge movable flap portion of the lifting structure, the chamber conveying the fluid for the fluid flow that is dispersing from the leading-edge movable flap slot towards the trailing edge portion. The intermediate slot portion of the airfoil further is a chamber that is disposed along the intermediate slot portion of the lifting structure, the chamber conveying the fluid for the fluid flow that is dispersing from the intermediate slot towards the trailing edge portion.

The present disclosure is thus not limited to airflow for aircraft and thus its teachings may be applied to any lifting body/surface with a fluid flow/liquid, gas, plasma, among others. Accordingly, in another form, an aerodynamic lifting system is provided that comprises a lifting structure defining a leading-edge portion, a trailing edge portion, an upper surface extending between the leading-edge portion and the trailing edge portion, and a lower surface extending between the leading-edge portion and the trailing edge portion.

Further areas of applicability will become apparent from the description provided herein. It should be understood that the description and specific examples are intended for purposes of illustration only and are not intended to limit the scope of the present disclosure.

BRIEF DESCRIPTION

Some of the embodiments will be described in detail, with references to the following Figures, wherein like designations denote like members, wherein:

FIG. 8A illustrates flows around and airfoil whilst preparing, during take-off and landing, as well as cruising an aircraft;

FIG. 8B illustrates exemplary flows established during take-off or landing;

FIG. 8C illustrates exemplary flows established during cruising; and

LIST OF REFERENCES

| Item No. | Item |
| --- | --- |
| 10 | Airfoil |
| 12 | Leading-edge |
| 14 | Trailing edge |
| 15 | Chord |
| 16 | Suction side |
| 18 | Pressure side |
| 20 | Injector slot |
| 21 | Flap hinge Arrangement |
| 22 | Injector flap |
| 24 | Injector flow |
| 25 | Injector flow speed |
| 26 | Canals |
| 30 | Additional slot |
| 32 | Additional flap |
| 34 | Additional flow |
| 35 | Additional flow speed |
| 40 | Free air flow |
| 50 | Flow generating means |
| 52 | Injector flow generating means |
| 54 | Additional flow generating means |
| 55 | Communication |
| 60 | Hinge arrangement |
| 70 | Airfoil leading-edge part |
| 71 | Airfoil leading-edge part chord |

-continued

| Item No. | Item |
| --- | --- |
| 72 | Airfoil trailing edge part |
| 73 | Airfoil trailing edge part chord |
| 75 | Chord line angle |
| 76 | Flap actuator arrangement |
| 77 | Rotatable element |
| 78 | Actuator arm |
| 79 | Slot |
| 80 | Internal structure |
| 81 | Internal structure |
| 82 | Air flow openings opening |
| 100 | Aircraft |
| 200 | Flight computer |
| 1000 | Method of operating an aircraft |
| 1010 | Method of preparing take-off |
| 1020 | Method of take-off or landing |
| 1030 | Method of cruising |
| 1100 | Providing |
| 1200 | Setting |
| 1300 | Generating slot flow |
| 1500 | Obtaining free air flow |
| 1600 | Adjusting |
| 1700 | Maintaining |
| 1800 | Closing |
| 1900 | Operating |

DETAILED DESCRIPTION

Figure 1:
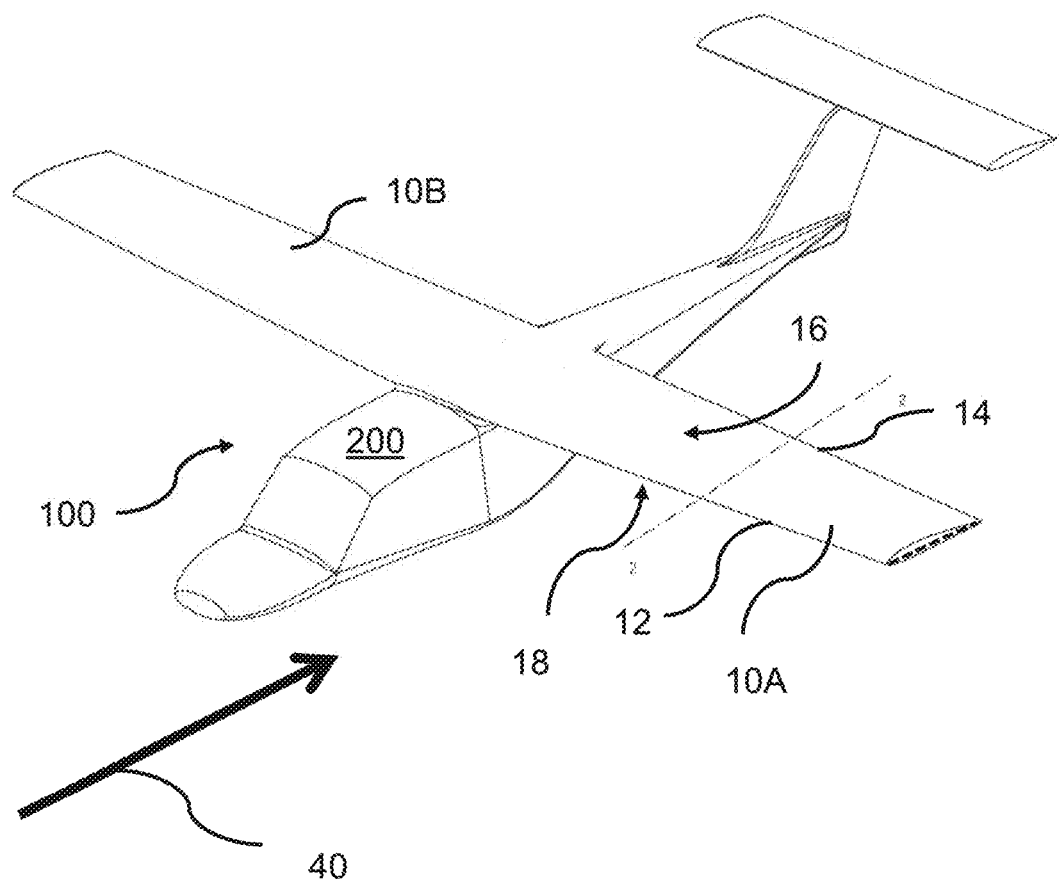
FIG. 1 illustrates a perspective view of aircraft having an airfoil as aerodynamic lifting system constructed according to the teachings of the present disclosure.

FIG. 1 illustrates an aircraft 100 configured with at least one airfoil 10, which here could be a first airfoil 10A and a second airfoil 10B for illustrative purposes.

The airfoil 10 may be configured for the aircraft 100 as exemplified in the following figures. Generally, the airfoil has a leading-edge 12 and a trailing edge 14. The airfoil 10 has a suction side 16 and a pressure side 18.

The aircraft 100 has a flight computer 200 that is configured to perform one or more actions as will be described.

Figures 2A, 2B:
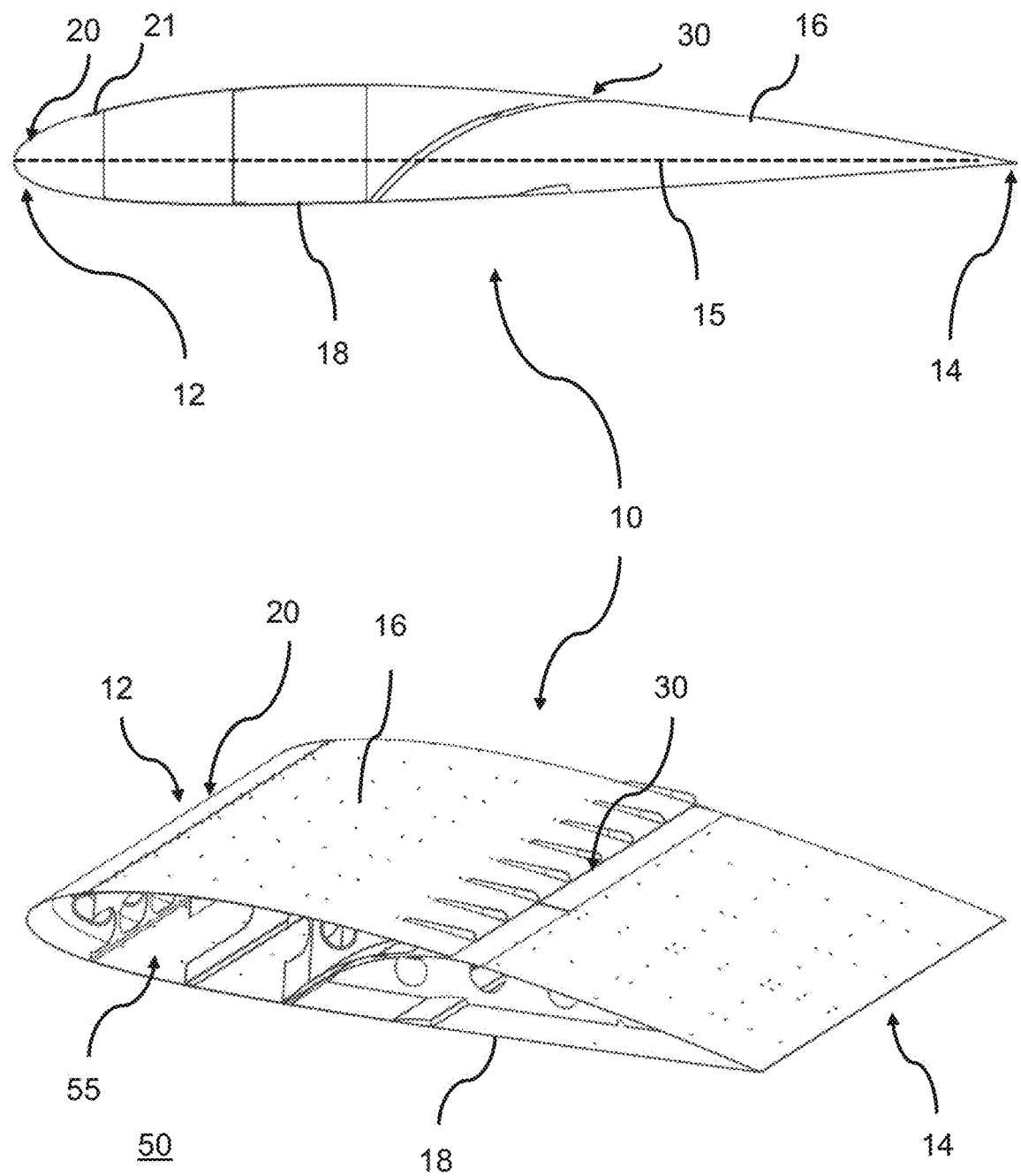
FIG. 2A illustrates a cross section and a perspective view of an embodiment of an airfoil.
FIG. 2B illustrates a perspective view of the airfoil of FIG. 2A.

FIG. 2A shows a cross section, e.g., section 2 of an airfoil 10, and FIG. 2B shows a perspective view of the same airfoil 10.

The airfoil 10 has a leading-edge 12 and a trailing edge 14. The airfoil 10 has a suction side 16 and a pressure side 18. The suction side 16 has an injector slot 20 towards the leading-edge 12 and at least one additional slot 30 towards the trailing edge 14 from the injector slot 20.

The airfoil 10 has a chord 15 as indicated in FIG. 2A.

The airfoil 10 has a chamber that serves as a communication of a flow as will be exemplified in e.g., FIGS. 8A-C.

The injector slot 20 and at least one additional slot 30 is in a communication 55 with flow generating means 50 (not shown) feeding a flow to the respective injection slot 20 and at least one additional slot 30.

Figure 3A:
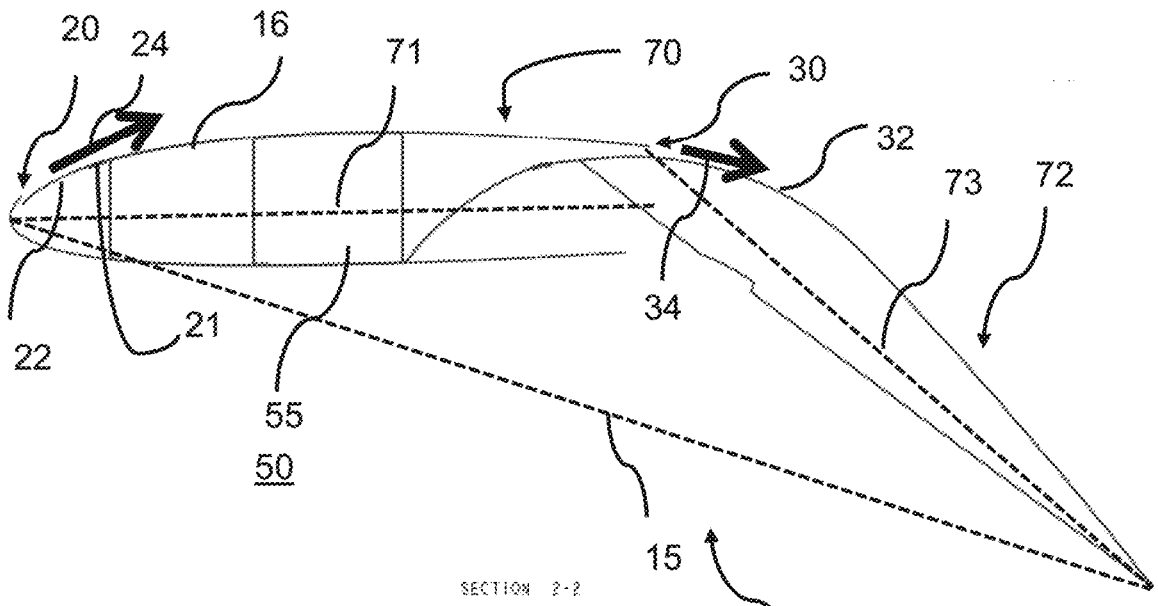
FIG. 3A illustrates a cross section and a perspective view of the embodiment of FIG. 2, but in a prepared setting.
Figure 3B:
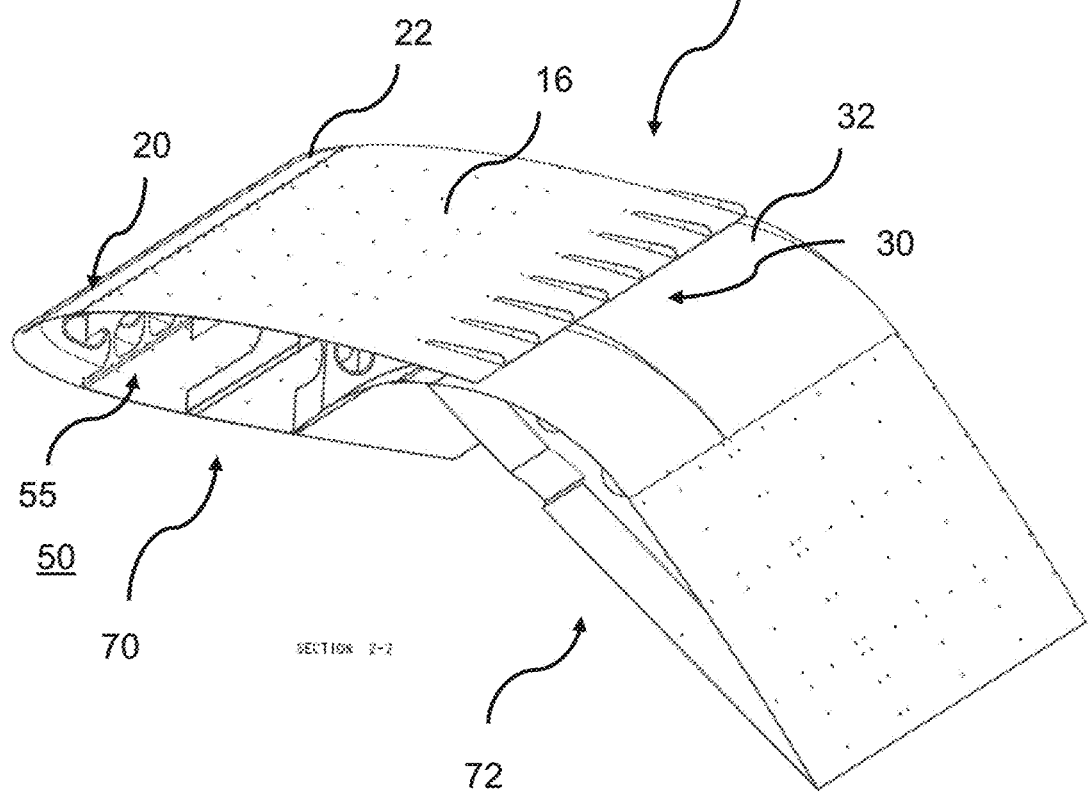
FIG. 3B illustrates a perspective view of the airfoil of FIG. 2B.

FIG. 3A shows a cross section, of an airfoil 10, and FIG. 3B shows a perspective view of the same airfoil 10.

FIGS. 3A and 3B illustrates the airfoil 10 from FIGS. 2A and 2B, but details the two-part form of the airfoil 10 formed by a leading-edge part 70 and a trailing edge part 72. The respective parts having respective leading chord 71 and trailing chord 73.

There is flow generating means 50 (not shown) feeding a flow to the communication 55 resulting in an injector flow 24 out of the injector slot 20 as a function of the operation of the injector flap 22. Likewise, the flow from the communication 55 results in additional flow 34 out of the additional slot 30 and from here towards the trailing edge.

In this embodiment, the injector flap 22 is hinged by a flap hinge arrangement 21 towards the trailing edge of the injector flap 22.

The additional slot 30 is formed between a leading-edge part 70 and a trailing edge part 72. The additional slot 30 is configured to operate to open, close, or regulate the opening of the additional slot 30. The operation is changing the trailing chord 73 line of the trailing edge part 72 relative to the leading-edge chord 73 line of the leading-edge part 70.

In this and other embodiments the additional slot 30 may be opened, closed and/or operated by one or more actuating devices which for example may be electrically operated.

Figure 4:
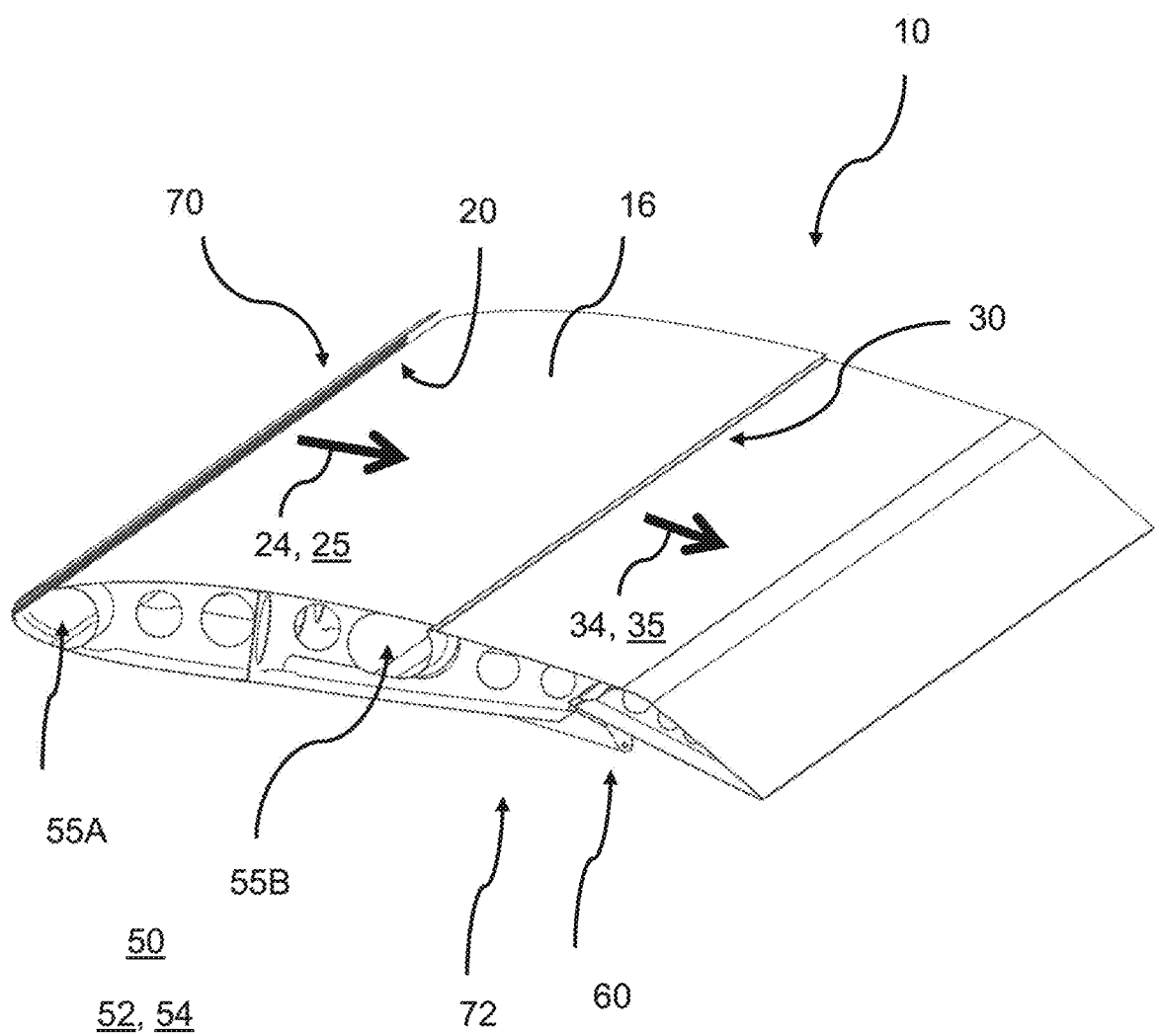
FIG. 4 illustrates a cross section and a perspective view of an embodiment of an airfoil as an alternative or with further aspects.

FIG. 4 illustrates an embodiment of an airfoil 10 with a similar configuration as illustrated in FIGS. 2 and 3.

This embodiment has a hinge-arrangement 60 operationally controlling the leading part 70 and the trailing part 72 of the airfoil 10. Independent hereof, the embodiment shows a first communication 55A for feeding the injector slot 20 and a second communication 55B for feeding the additional slot 30.

Optionally, the injector slot 20 is configured with injector slot flow generating means 52 feeding an injector flow 24 at an injector flow speed 25 and wherein the at least one additional slot 30 is configured with additional slot flow generating means 54 feeding an additional flow 34 at an additional flow speed 35 different or independent of the injector flow speed 24.

Figure 5:
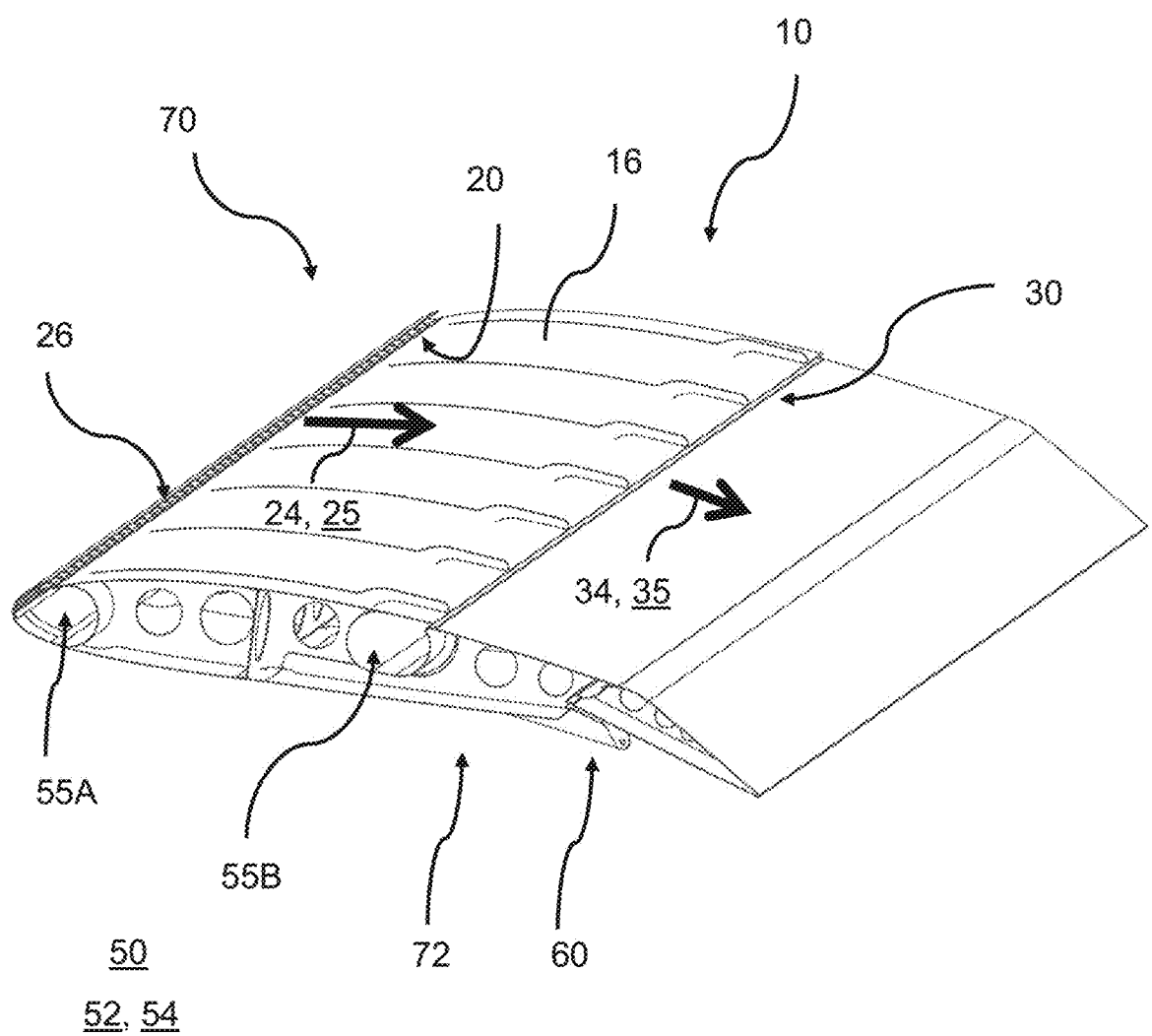
FIG. 5 illustrates a cross section and a perspective view of an embodiment of an airfoil as an alternative or with further aspects.

FIG. 5 illustrates in continuation of the previous figures, this figure illustrates an embodiment of an airfoil as disclosed further configured with an arrangement or array of multiple gates, canals 26, outlets in the injector slot. The suction side 16 is further configured with stream liners in the leading-edge—trailing edge direction.

Optionally, an additional slot may be configured with similar gates, canals, or outlets.

FIGS. 6 and 7 illustrate methods or acts of operating an aircraft comprising at least one airfoil as outlined or another suitable airfoil. FIG. 8 illustrates exemplary flows as established.

Figure 6A:
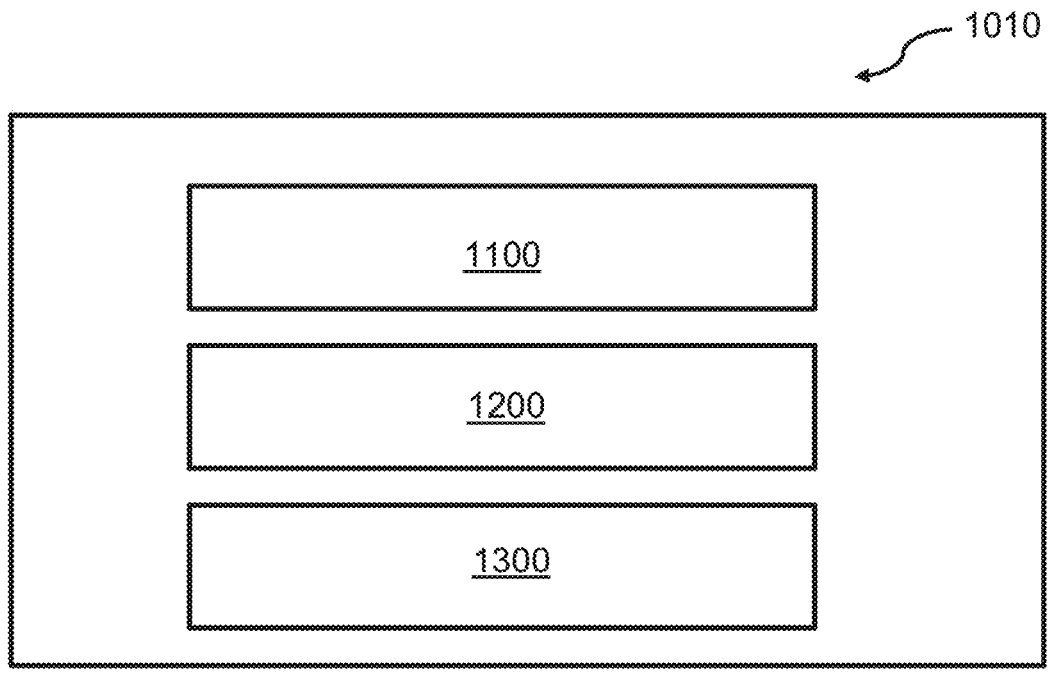
FIG. 6A illustrates acts related to methods of preparing and during take-off and landing an aircraft.

FIG. 6A illustrates a method of preparing take-off 1010 of an aircraft with an airfoil.

There is an act of providing 1100 an open injector slot and at least one open additional slot.

There is an act of setting 1200 a chord line angle between the trailing edge part chord line of the trailing edge part and the leading-edge part chord line of the leading-edge part. With reference to e.g., FIG. 3, the airfoil has a leading-edge part 70 with a leading-edge part chord 72 and a trailing edge part 72 with a trailing edge part chord 73.

There is an act of generating slot flow 1300 to respective injector slot and at least one additional slot.

Figure 6B:
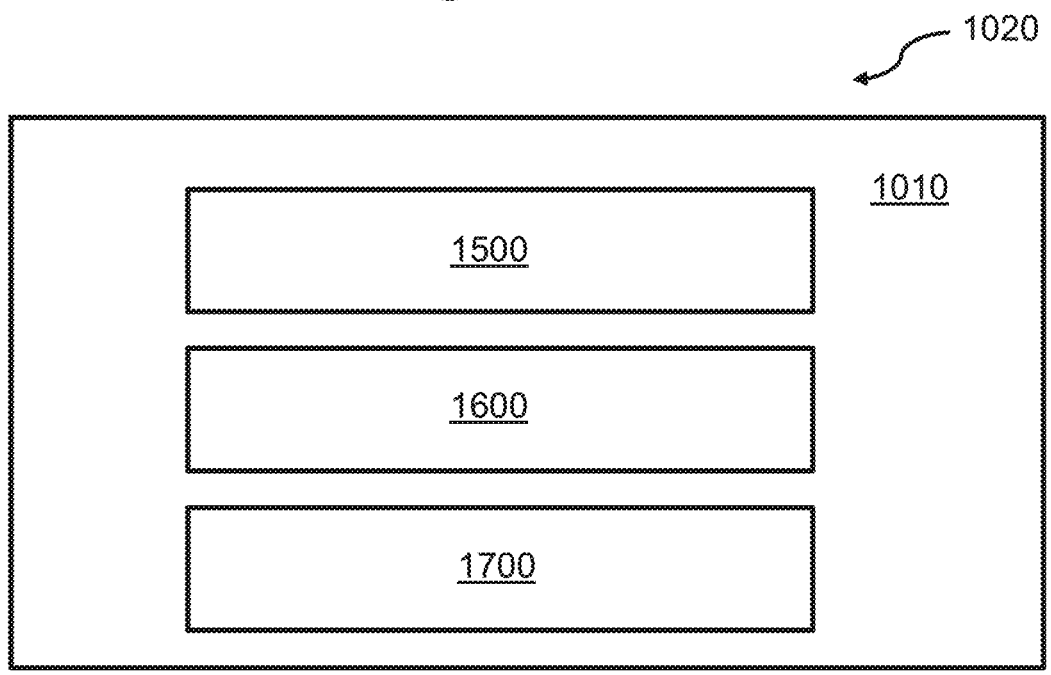
FIG. 6B illustrates a method of take-off or landing.

FIG. 6B illustrates a method of take-off or landing 1020. In an embodiment, the method 1020 may be performed after the method of preparing take-off 1010 or after cruising or in flight.

In an embodiment, the method 1020 comprises the following acts:

There is an act of obtaining free air flow 1500 around the airfoil. The free airflow may be established by a thrust or drive driving the aircraft or by auxiliary air flow means. Wind conditions will also contribute to the free air flow.

There is an act of adjusting 1600 the angle of attack (AoA) of the airfoil (10).

At the same there is an act of maintaining 1700 a suction side flow from the injector slot and towards the trailing edge substantially laminar. The act of maintaining may be by using an airfoil as disclosed and/or by adjusting parameters such as the AoA, the free air flow speed, or by altering or adjusting the openings of the slots in the airfoil, altering or adjusting the slot flows.

Figure 7A:
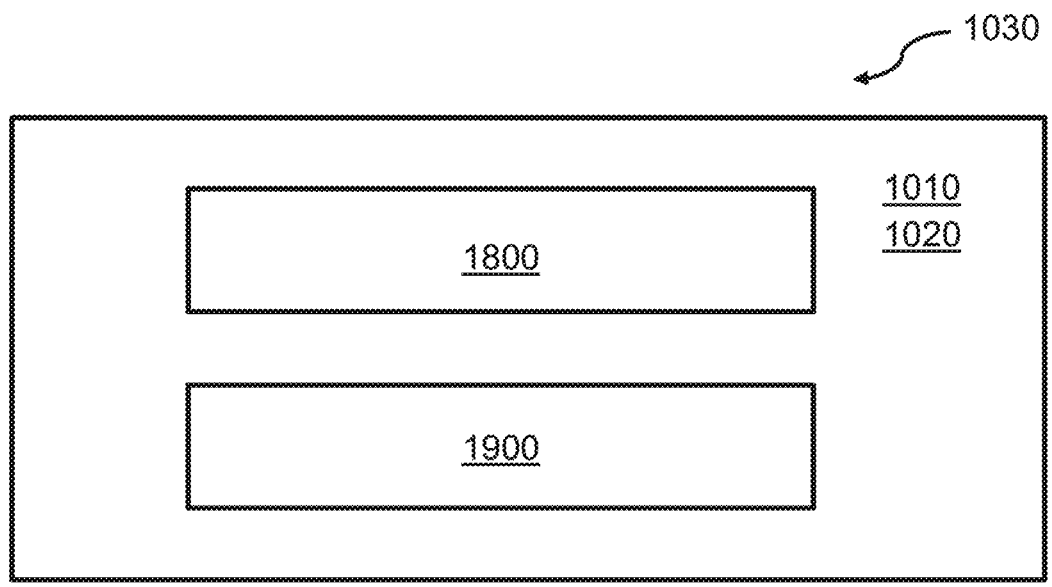
FIG. 7A illustrates acts related to methods of cruising and operating an aircraft.

FIG. 7A illustrates a method of cruising 1030 the aircraft with an airfoil as disclosed.

There is an act of closing 1800 the injector slot 20 and the at least one additional slot. There is an act of operating 1900 the aircraft 100 in flight or with aligning the chord lines of the trailing edge part 72 and of the leading-edge part 70.

Figure 7B:
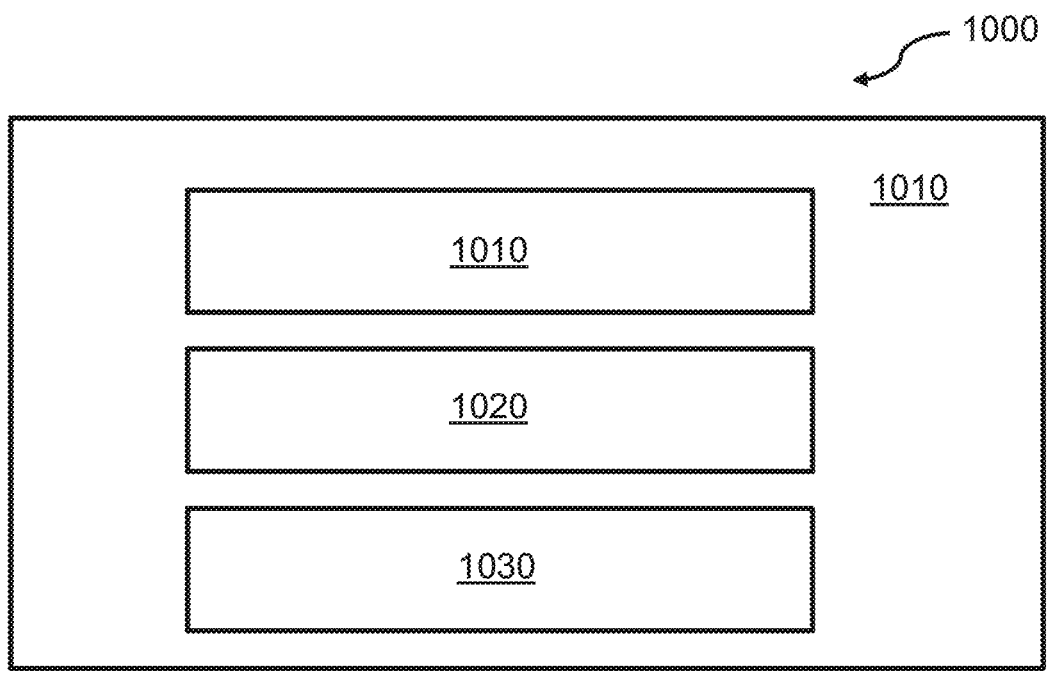
FIG. 7B illustrates a method of operating an aircraft.

FIG. 7B illustrates a method of operating an aircraft 1000. In an embodiment, the method 1000 may comprise of the methods 1010, 1020, 1030 outlined in FIGS. 6A, 6B and 7A. In an embodiment, the method of operating 1000 is further exemplified in FIGS. 8A-C where FIG. 8A illustrates exemplary flows established during preparing take-off 1010 as outlined in FIG. 6A, where FIG. 8B illustrates exemplary flows established during take-off or landing 1020 as outlined in FIG. 6B, and where FIG. 8C illustrates exemplary flows established during cruising 1030 or whilst in flight.

FIG. 8A is when preparing the take-off for an aircraft comprising an airfoil as disclosed. Preparing involves opening the injector slots and an additional slot (a booster slot). The flows are established and fed to the slots as illustrated so that high velocity air flow is engaged through internal chambers described. The air is dispersed from the slots as described and follows the contour defined by the airfoil. Capillary effects contribute hereto.

FIG. 8B is once the aircraft reaches the horizontal velocity required for lift or optimum lift.

The aircraft attitude is rotated to a higher-than-normal angle of attack (AoA) relative to the free airflow. The stagnation point is through this procedure located unusually close to the trailing edge.

The laminar airflow is maintained by the active airflow as described. The high AoA will provide an unusually high lift, resulting in the aircraft to take-off at an unusual low horizontal velocity, e.g., Super-STOL.

The horizontal aircraft velocity is increased towards a normal climb or cruise velocity, and the AoA is decreased synchronously with adjusting or retraction of injector and additional (booster) slots along with reduced air jets velocity.

The same procedure is followed in reversed order during descend and landing.

FIG. 8 illustrates aspect of operating an aircraft 1000 with an airfoil 10 having a leading-edge 12, a trailing edge 14 and a suction side 16. The suction side 16 has an injector slot 20 and an additional slot 30.

FIG. 8A is when preparing 1010 the take-off for an aircraft as disclosed. Preparing involves opening the injector slot 20 and an additional slot 30 (a booster slot). The flows are established and fed to the slots as illustrated so that high velocity air flow is engaged through internal chambers described. Injector flow generating means 52 provide the injector slot flow 24 at an injector flow speed 25. Additional flow generating means 54 provide the additional flow 34 at an additional flow speed 35. The air is dispersed from the slots as described and follows the contour defined by the airfoil. Capillary effects contribute hereto.

FIG. 8B in continuation of FIG. 8A is once the aircraft reaches the horizontal velocity required for lift or optimum lift.

The aircraft attitude is rotated to a higher-than-normal angle of attack (AoA) of the chord 15 relative to the free airflow 15. The stagnation point is through this procedure located unusually close to the trailing edge 14.

The laminar airflow is maintained by the active airflow as described. The high AoA will provide an unusually high lift, resulting in the aircraft to take-off at an unusual low horizontal velocity, e.g., Super-STOL.

The horizontal aircraft velocity is increased towards a normal climb or cruise velocity, and the AoA is decreased synchronously with adjusting or retraction of injector and additional (booster) slots along with reduced air jets velocity.

The same procedure is followed in reversed order during descend and landing.

FIG. 8C illustrates the flows and settings during cruise or in flight 1030. The injector slot 20 and the additional (booster) slot 30 are fully closed and retracted, and the active airflow is suspended. The airfoil in the free airflow 40 provides the necessary lift for the aircraft and thus normal flight characteristics are ensured.

Figure 9:
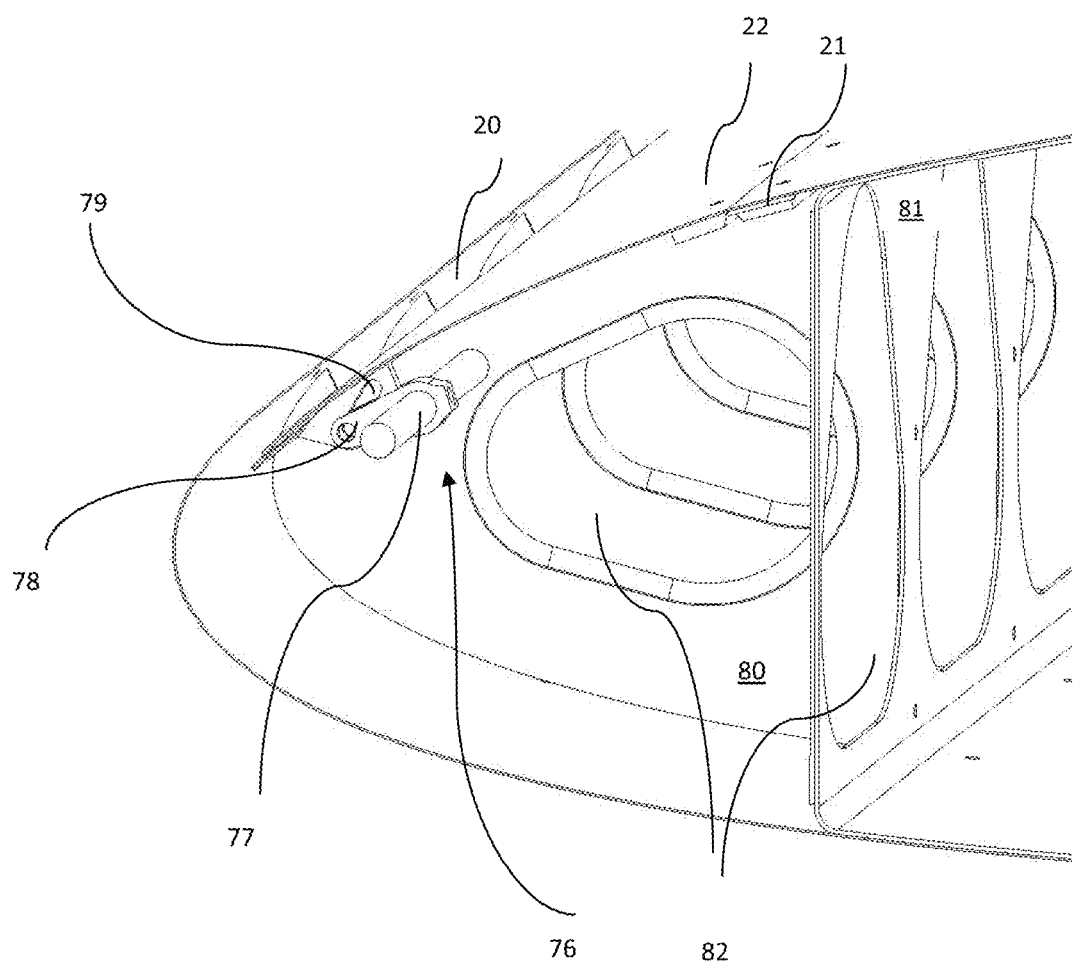
FIG. 9 illustrates a close up of a leading-edge part of an airfoil.

FIG. 9 is a close-up of an airfoil section closest to the leading-edge in any of the embodiments illustrated in the preceding figures.

It is seen that the hinge of the flap-hinge arrangement 21 may be a sheet hinge arranged on the inside of the airfoil whereby an air tight flap hinge arrangement may be achieved.

The injector flap 22 and thereby the injector slot 20 may be controlled i.e., activated, opened, closed, regulated by a flap actuator arrangement 76 comprising a rotatable element 77 with an actuator arm 78. The actuator arm 78 has a pin (not shown) which slides in a slot 79 when the rotatable element 77 is activated and thereby rotated.

The canals previously mentioned are not shown in the present embodiment but may be present in these embodiments as they may be in any of the embodiments illustrated in previous figures.

Internal structures 80 and 81 are provided to ensure stability of the air foil. The internal structures 80, 81 may comprise various air flow openings 82 to ensure air flow in the air foil.

Furthermore, the internal structures 80, 81 particularly the internal structures 80 arranged in the length direction of the air foil may have recesses or similar to support the injector flap 22 when the injector slot is fully open thereby preventing the injector flap 22 from opening too much unintentionally.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An airfoil configured for an aircraft, comprising:
   a leading edge;
   a trailing edge;
   a suction side having an injector slot towards the leading edge;
   at least one additional slot towards the trailing edge;
   a pressure side;
   a leading edge part with a leading edge chord line;
   a trailing edge part with a trailing chord line;
   an injector flap configured to operate on the suction side and to open, close, and/or regulate the opening of the injector slot; and
   a plurality of internal structures arranged in a span direction of the airfoil for supporting the injector flap, said internal structures having multiple airflow openings for ensuring airflow in the airfoil;
   wherein the leading edge part and the trailing edge part together form the airfoil depending on their relative position,
   wherein the injector flap is hinged by a hinge arrangement towards a trailing edge of the injector flap,
   wherein the leading edge part and the trailing edge part are configured and arranged relative to each other so as to form the at least one additional slot with an opening in the leading edge body of the airfoil, and
   wherein the trailing edge part is configured to open, close and/or regulate the opening of the at least one additional slot, by rotating such that the trailing edge is moved towards the pressure side, wherein the additional slot opening in the leading edge body opens for supplying additional airflow from the leading edge part to the trailing edge of the airfoil.

2. The airfoil according to claim 1, wherein the additional slot is disposed along the suction side of the airfoil between the leading edge part and the trailing edge part and wherein the additional slot is opened and closed by dividing the airfoil at the intended slot position and hinging the trailing edge part towards the airfoil on the pressure side, such that the additional slot on the suction side is exposed when the trailing edge part is moved downwards towards the pressure side.

3. The airfoil according to claim 1, further comprising at least one additional flap configured to operate to open, close, or regulate the opening of the at least one additional slot.

4. The airfoil according to claim 1, wherein the injector slot and at least one additional slot is in communication with flow generating means feeding a flow to the respective injection slot and at least one additional slot.

5. The airfoil according to claim 1, wherein the injector slot is configured with injector slot flow generating means feeding an injector flow at an injector flow speed, and wherein the at least one additional slot is configured with additional slot flow generating means feeding an additional flow at an additional flow speed different or independent of the injector flow speed.

6. A method of operating an aircraft the method comprising:
   providing an airfoil having a leading edge, a trailing edge, a suction side having an injector slot towards the leading edge, at least one additional slot towards the trailing edge, the at least one additional slot having an opening in the leading edge body of the airfoil, a pressure side, a leading edge part, a trailing edge part, a plurality of internal structures arranged in a span direction of the airfoil for supporting the injector flap, said internal structures having multiple airflow openings for ensuring airflow in the airfoil, and an injector flap configured to operate on the suction side and to open, close, and/or regulate the opening of the injector slot, wherein the leading edge part and the trailing edge part together form the airfoil depending on their relative position, wherein the injector flap is hinged by a hinge arrangement towards a trailing edge of the injector flap, wherein the leading edge part and the trailing edge part are configured and arranged relative to each other so as to form the at least one additional slot, wherein the trailing edge part is configured to open, close, and/or regulate the opening of the at least one additional slot, by rotating such that the trailing edge is moved towards the pressure side, wherein the additional slot opening in the leading edge body opens to supply additional airflow from the leading edge part to the trailing edge of the airfoil; and generating slot flow to the respective injector slot and at least one additional slot.

7. The method of claim 6, further comprising:
obtaining free air flow around the airfoil;
adjusting angle of attack of the airfoil; and
maintaining a substantially laminar suction side flow from the injector slot and towards the trailing edge.

8. The method of claim 6, further comprising:
closing the injector slot and the at least one additional slot; and
operating the aircraft in flight with the chord lines of the trailing edge part and of the leading-edge part aligned.

9. A flight computer configured to perform the acts of claim 6.

10. An aircraft configured with at least one airfoil according to claim 1 and a flight computer.

* * * * *